Jan. 30, 1945.　　　G. A. LYON　　　2,368,241
WHEEL STRUCTURE
Filed Feb. 25, 1943
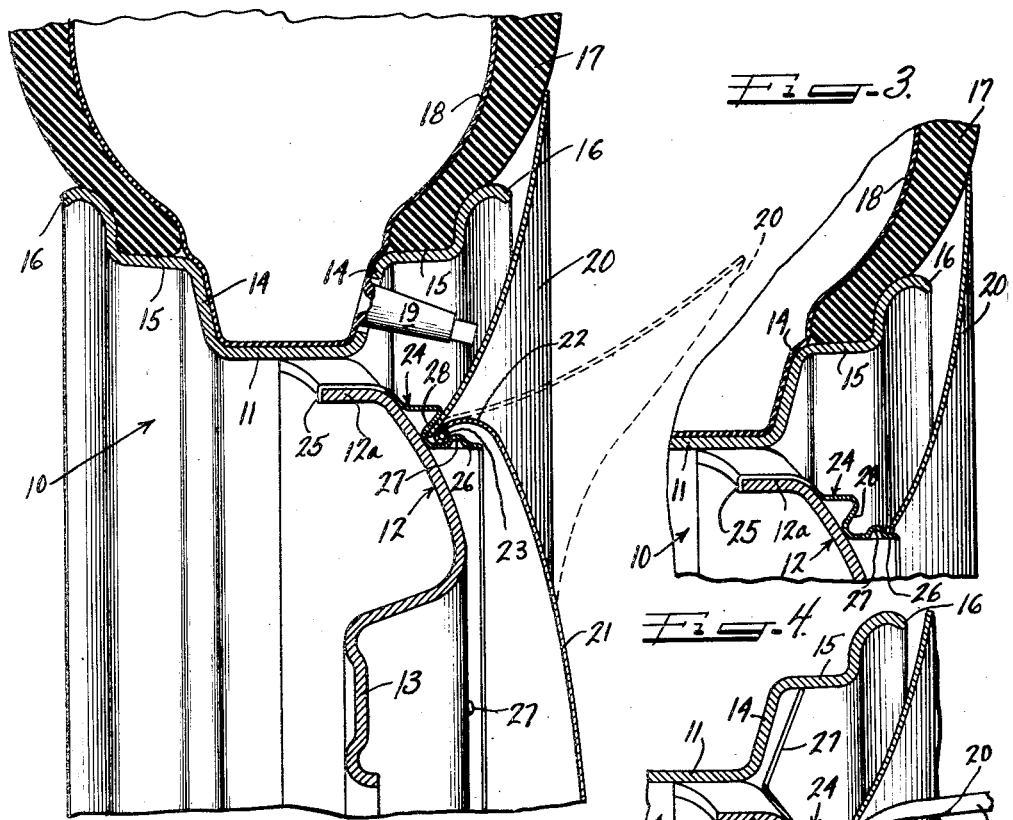
Inventor
GEORGE ALBERT LYON.
by Charles W. Hill Attys.

Patented Jan. 30, 1945

2,368,241

UNITED STATES PATENT OFFICE 2,368,241

WHEEL STRUCTURE

George Albert Lyon, Allenhurst, N. J.

Application February 25, 1943, Serial No. 477,002

4 Claims. (Cl. 301—37)

This invention relates to an improved wheel structure and is directed more particularly to an improved and novel wheel cover assembly therefor, and more particularly to a novel arrangement for attaching the cover assembly to the wheel structure.

An important object of the invention is to provide a wheel cover which is constructed in such a cross-sectional curvature that the flanges of the tire rim are concealed and the cover itself simulates the curvature of the side wall of a tire on the rim to present in effect a massive tire on a centrally disposed supporting structure of minimum dimension.

Another object of the invention is to provide in a wheel structure, a cover assembly which effectively conceals or substantially conceals the valve stem and conceals wheel balancing weights or other appurtenances which may be associated with the tire rim and which, when colored white, is so arranged as to constitute in effect the side wall of a tire on the wheel to give the appearance of a white side wall of the tire.

Still another object of the invention is to provide an improved wheel cover whereby the accessories on a wheel structure to which the cover is attached are readily available for servicing without requiring repeated removal of the cover member itself although these accessories are housed on the axially inner side of the cover member.

According to my invention there is provided herein a cover assembly including an outer portion constructed from a synthetic plastic, rubber either synthetic or natural, or from any other material giving the cover rubber-like characteristics in that it may be locally resiliently flexed away from the wheel structure to afford access to the rear side thereof and will return to its original shape and configuration when the flexing pressure is released therefrom. In this regard it is to be understood that the use of the term "rubber-like" in the appended claims is intended to connote a cover member constructed from any material which affords the flexible characteristics above mentioned.

An important object of the invention is to provide for a wheel structure a cover member which is so cross-sectionally configurated as to have a curvature of such magnitude that it effectively conceals the outer side of the tire rim and the edge portion thereof and may be locally resiliently flexed away from the rim to afford access to the rear side thereof, said cover member being retained upon the wheel structure by novel retaining means.

Still another object of the invention is to provide for a wheel cover having the above mentioned characteristics, novel retaining means which is constructed and arranged so as to back-up or reinforce that part of the flexible cover member which is clampingly secured to the wheel structure.

It is a more specific object of the invention to provide for a wheel structure a cover assembly including an outer annular rubber-like or flexible portion and a central hub cap portion, the annular portion being held onto the wheel structure by virtue of a snap-on engagement of the hub cap portion to the wheel structure.

Still another object of the invention is to provide novel retaining means for securing a rubber-like flexible cover member to a wheel structure, this retaining means being so arranged as to afford a backing element for the flexible cover whereby the latter may withstand abutment by a pry-off tool during the pry-off operation of an associated cover member.

Other objects and advantages of the invention will become apparent from the following description and accompanying drawing in which:

Figure 1 is a fragmentary cross-sectional view of a wheel structure having a tire thereon and embodying one form of my invention;

Figure 2 is a side elevational view with a part broken away showing the structure of Figure 1;

Figure 3 is a fragmentary cross-section view of the construction shown in Figure 1 showing the outer cover member in partially assembled relationship thereto;

Figure 4 is a fragmentary cross-sectional view of a wheel structure showing a modified form of my invention; and Figure 5 is a fragmentary cross-sectional view of a wheel structure showing a still modified form of my invention.

It is to be understood that the embodiments shown herein may be changed or modified without departing from the spirit and scope of my invention as set forth in the appended claims.

As shown in Figure 1 the reference character 10 designates generally a multiflange, drop center type tire rim which is connected as by riveting or welding or the like through the base flange 11 to the central body part or spider 12 which includes a central bolt on flange 13. The drop center rim 10 is further provided with opposite side flanges 14, opposite intermediate flanges 15 and opposite edge portions 16. A tire 17 having an inner tube 18 and a valve stem 19 is mounted upon the rim, one of the side walls 14 having an orifice through which the valve 19 may project.

An ornamental cover member, which may be in disk form to cover the entire outer side of the wheel structure but which in the present instance, for purposes of illustration, is shown as an annulus 20, and is provided with such a cross-sectional configuration and curvature that it presents in effect a continuation of the side wall of the tire 17 when disposed in overlying relationship to the outer side of the tire rim 10. The cover member 20 is of such radial depth that it extends from a portion of the body part 12 radially outwardly over the tire rim 10 and beyond the edge portion 16 thereof to the side wall of the tire 17 and to a part thereof radially inwardly relative to the widest part of the bulge therein.

From such a construction it will be seen that the cover member 20 instead of presenting a sharp axially inward curve from the outer periphery thereof, presents a gradual curve which gives the effect of the continuation of the side wall of a tire and thus the appearance of being a part thereof whereby, if it is colored white, it gives the appearance of being a white side wall of the tire. Furthermore the cover member 20, since it extends radially outwardly beyond the edge portion 16 of the tire rim, effectively conceals the junction between the tire rim and the tire as well as the outer portion of the tire rim and the appurtenances associated therewith such as the valve stem 19.

As indicated previously the cover member 20 is preferably constructed from a synthetic plastic, rubber, synthetic or natural, or from some other substance which has rubber-like qualities in that it may be locally deformed for the purpose of providing access to the rear side of the cover member and yet will return to normal position when flexing or distorting pressure is released therefrom.

This distortion of the cover member 20 is shown in dotted lines in Figure 1.

In the embodiment of Figure 1 the cover assembly includes, in addition to the annular outer portion 20, a central hub cap portion 21 which is turned axially inwardly as at 22 at the outer edge thereof, and is provided with a peripheral attachment bead as shown at 23.

In attaching a cover assembly including an outer annular portion and a central hub cap portion to a wheel assembly it is highly desirable that the central hub cap portion be readily available for removal in order to expose the bolt on members to provide for removal of the wheel structure from a vehicle. If the cover portions are attached together then of course both are removed by a single operation. If however they are not attached to one another at their juxtaposed peripheries, as in the present case, it is highly desirable that when the hub cap member be removed, the annular portion be retained on the wheel where it will be less likely to be subjected to breakage.

As shown in the present embodiment the inner peripheral edge of the cover member 20 is maintained in abutting relationship with the outer peripheral part of the hub cap portion 21 and, as will be explained presently, removal of the hub cap portion 21 may be obtained independently of the removal of the annular portion 20.

To the end that the cover assembly parts may be secured to the wheel in the above mentioned relationship there is provided herein a retaining structure 24 which may be in the form of individual clips but is shown in the present instance as circular or annular in form. As will be seen from Figure 1 the retaining structure 24 includes an attachment part 25 which is formed to extend axially inwardly between spaced openings formed in the junction between the spider 12 and the inner surface of the base flange 11 of the tire rim, is formed to overlie the upper part of the flange 12a of the body part, and is bent around the axially inner edge thereof to provide a secure attachment. The retaining structure 24 is also provided with a substantially axially outwardly extending retaining part which includes an axially outwardly extending flange 26. The latter is provided with radially outwardly extending attachment means 27 which may be in the form of a rib but in the present instance are shown as spaced humps. The portion of the retaining structure 24 between the attachment part 25 and the hump flange 26 includes a re-entrant formed portion which is arranged to provide an axially outwardly, radially outwardly, obliquely disposed wall 28 against which the inner peripheral margin of the cover member 20 may be disposed.

As will be seen, this re-entrant formation of the intermediate part of the retaining structure and the resulting obliquely disposed wall 28 provides for a secure non-vibrating attachment of the cover part and furthermore affords the construction against which a pry-off tool may be urged for removal of the hub cap member without distorting or breaking the frangible outer cover part 20.

In assembling the cover assembly upon the wheel structure the outer cover portion 20 is first urged axially inwardly with the peripheral edge overriding the humps 27 on the flange 26 of the retaining structure. Thereafter, the hub cap portion 21 is likewise urged axially inwardly with the bead 23 thereof overriding the humps, whereupon the bead is lodged tightly against the axially inner spaces of the humps 27 to tightly sandwich the inner peripheral margin of the cover portion 20 against the axially outer face of the wall 28 of the retaining structure. Thus it will be seen that a secure non-vibrating attachment of the cover portion 20 is obtained by virtue of the application of the central hub cap portion 21 to the wheel structure.

Another feature of the cover portion 20 is the retention thereof upon the wheel structure under a condition of stress whereby the outer peripheral edge thereof is held tightly against the side wall of the tire with pressure engagement. This pressure engagement is important since it insures the cover portion against assuming a spaced relation with respect to the side wall of the tire and furthermore it insures that the outer peripheral edge of the portion 20, after it has flexed outwardly axially under the influence of lateral expansion of the tire under load conditions, will hug the side wall of the tire during the lateral contraction of the same as the load is released therefrom during rotation of the tire. In this manner it will be seen that I have provided a construction wherein the outer peripheral edge of the cover member 20 is at all times in engagement with the side wall of the tire whether the tire be laterally contracted, laterally expanded, or in transition from one of the foregoing stages to the other.

This condition of stress upon the cover member 20 is obtained during the application thereof to the wheel structure as shown in Figure 3.

Generally this stress condition of the cover member 20 is effected by slightly distorting the same during the attachment operation and retaining this distorted condition after the attachment has been completed. As will be seen from Figure 3, which represents a partial attachment of the annular member 20, the latter has been placed against the wheel structure in a position in which the outer peripheral edge of the annulus has engaged the side wall of the tire. In this position it will be seen that the inner peripheral edge of the cover member 20 has not yet overridden the humps 27. It will also be seen that further axially inward movement of the cover member from the position shown in Figure 3 will involve continued axially inward movement of the inner peripheral edge thereof while the outer periphery thereof continues to abut the side wall of the tire thus preventing further inward movement. This being the case, further inward movement of the annulus 20 will involve a distortion thereof which places it under stress, this condition of stress being maintained after it is in its final position as shown in Figure 1.

From the foregoing it will be seen that the wall 28 and the humps 27 of the retaining structure 24 act to clampingly secure the bead 23 of the hub cap portion 21 and the inner peripheral marginal portion of the cover portion 20 tightly in assembled position.

Another advantage of the wall portion 28 of the retaining structure 24 becomes evident during removal of the hub cap portion 21 by a pry-off operation. The manner in which the pry-off tool T is applied to the cover assembly for removal of the hub cap portion 21 is shown clearly in Figure 4. In this operation the point of the tool T is inserted between the inner peripheral margin of the cover part 20 and the outer peripheral margin of the hub cap 21 whereupon the tool is raised as shown in Figure 4 to pry the bead 23 over the hump 27 to remove the same. In this operation it will be seen that the pry-off leverage is obtained by the abutment of the tool against the inner peripheral margin portion of the cover member 20 and since the latter is relatively frangible it will be understood that ordinarily this pry-off operation would distort or damage the cover portion 20. However with the present construction the wall 28 is available as a rigid backing member for the inner peripheral margin of the cover portion 20 whereby it completely protects the same against damage by the pry-off tool during the pry-off operation.

In the construction shown in Figure 4 the retaining assembly is similar to that disclosed in the construction of Figure 1 with the exception that the attachment portion of the retaining structure 24 comprises fingers 29 which are disposed obliquely, radially outwardly, axially outwardly so that the terminal ends thereof prescribe a circle having a larger diameter than that prescribed by the inner surface of the intermediate flanges 15. Thus when the retaining structure 24 is urged axially inwardly of the wheel structure the terminal ends of the fingers 29, being sharp, bite into the radially inner surface of the intermediate flange 15 and thus provide a secure attachment assembly. This construction is particularly well adapted for use with wheel structures wherein no spaces are provided between the flange 12a of the body part or spider 12 and the radially inner surface of the base flange 11 of the tire rim.

In the construction shown in Figure 5 the retaining structure 24 is similar to that described in conjunction with Figure 4 except that the attachment portion includes fingers which comprise arms 30 which extend axially inwardly and are adapted to overlie the radially outward surface of the flange 12a of the body part 12 at the portions thereof spaced from the base flange 11, these arms 30 terminating in fingers 31 which are disposed obliquely, radially outwardly, axially outwardly to bite against the radially inner surface of the base flange 11 in a manner similar to that described in connection with the fingers 29 of Figure 4.

From the foregoing it will be seen that there is provided herein a cover assembly for a wheel structure said cover assembly having a radially outer part constructed to overlie the outer side of the tire rim and the junction thereof with the tire and arranged to be flexed locally, either manually, to afford access to the rear side thereof, or during lateral expansion of the tire when rotated under load bearing conditions. Furthermore, there is provided herein a novel retaining assembly for the cover whereby a central hub cap portion may be snapped on to the wheel structure to retain the frangible outer part securely in non-vibrating position and whereby the retaining structure is so arranged as to provide a rigid support for the frangible part of the cover assembly during a pry-off operation by which the central hub-simulating part is removed from the wheel structure.

It will be understood that while my invention has been described herein in conjunction with an annular trim portion having a part engaging the side wall of a tire in a tire rim of a wheel structure to which it is attached, it is equally well adapted for use with a structure wherein the tire cover extends merely to the edge portion of the tire rim of the wheel. Furthermore, the advantages of my invention may be availed of in use with an outer cover member constructed from steel or other material.

What I claim is:

1. In a wheel structure having a tire rim, a cover assembly including a radially outer annular part arranged to overlie the outer side of the tire rim to conceal the same and having a cross-sectional configuration of such curvature and magnitude so as to constitute in effect a continuation of the side wall of a tire on the rim and being constructed to be flexed locally to afford access to the rear side thereof, a radially inner hub cap part having a beaded outer periphery, and a retaining structure having a part for securing it to the wheel structure and a retaining part, said retaining part including a substantially axially outwardly extending part having a radially outward protuberance and a part formed to provide a backing wall, the inner margin of said outer cover part and the outer edge of said hub cap member being arranged to fit tightly between said protuberance and said backing wall when urged axially inwardly over said protuberance.

2. In a wheel structure having a tire rim, a cover assembly including an outer annular part and a central hub cap part, and a retaining structure including means secured to the wheel structure and a retaining portion arranged to provide a backing surface and a snap-on pry-off retention element between which the radially inner portion of the outer cover part and the radially outer portion of the inner cover part may be tightly wedged in snap-on pry-off relationship.

3. In a wheel structure having a tire rim, a cover assembly including a part having a radially inner peripheral edge arranged for attachment to the wheel structure and a central hub cap part having an outer peripheral edge arranged for attachment to the wheel structure, a retaining structure including a part for attachment to the wheel structure and a retaining part so cross-sectionally configured as to provide an obliquely disposed, radially outwardly, axially outwardly extending backing wall portion terminating at its radially inner edge in a substantially outwardly extending flange having a snap-on protuberance formed therein, said edge portions of the cover members being arranged to be disposed over said flange on the retaining part of the retaining structure in snap-on, pry-off relationship with the inner edge of the outer cover member disposed in surface engagement with the outer surface of the backing member and the outer edge of the inner cover member being disposed tightly between the axially outer surface of the adjacent portion of the outer cover member and the inner side of the snap-on protuberance.

4. In a wheel structure having a tire rim, a body part, and spaces formed at the junction of said parts, a retaining structure for securing a cover assembly to the wheel structure including an attachment portion arranged to extend substantially axially inwardly of the spaces between the tire rim and the body portion to be attached to the wheel structure, and a retaining portion having such a cross-sectional configuration as to provide axially spaced, substantially radially outwardly extending parts arranged to receive an inner marginal portion of an outer cover member and an outer marginal portion of an inner cover member disposed over the wheel structure in tight sandwiched relationship, the axially outer part comprising a protuberance adapted to receive the edge portions of said cover members in snap-on, pry-off relationship.

GEORGE ALBERT LYON.